Patented Sept. 2, 1924.

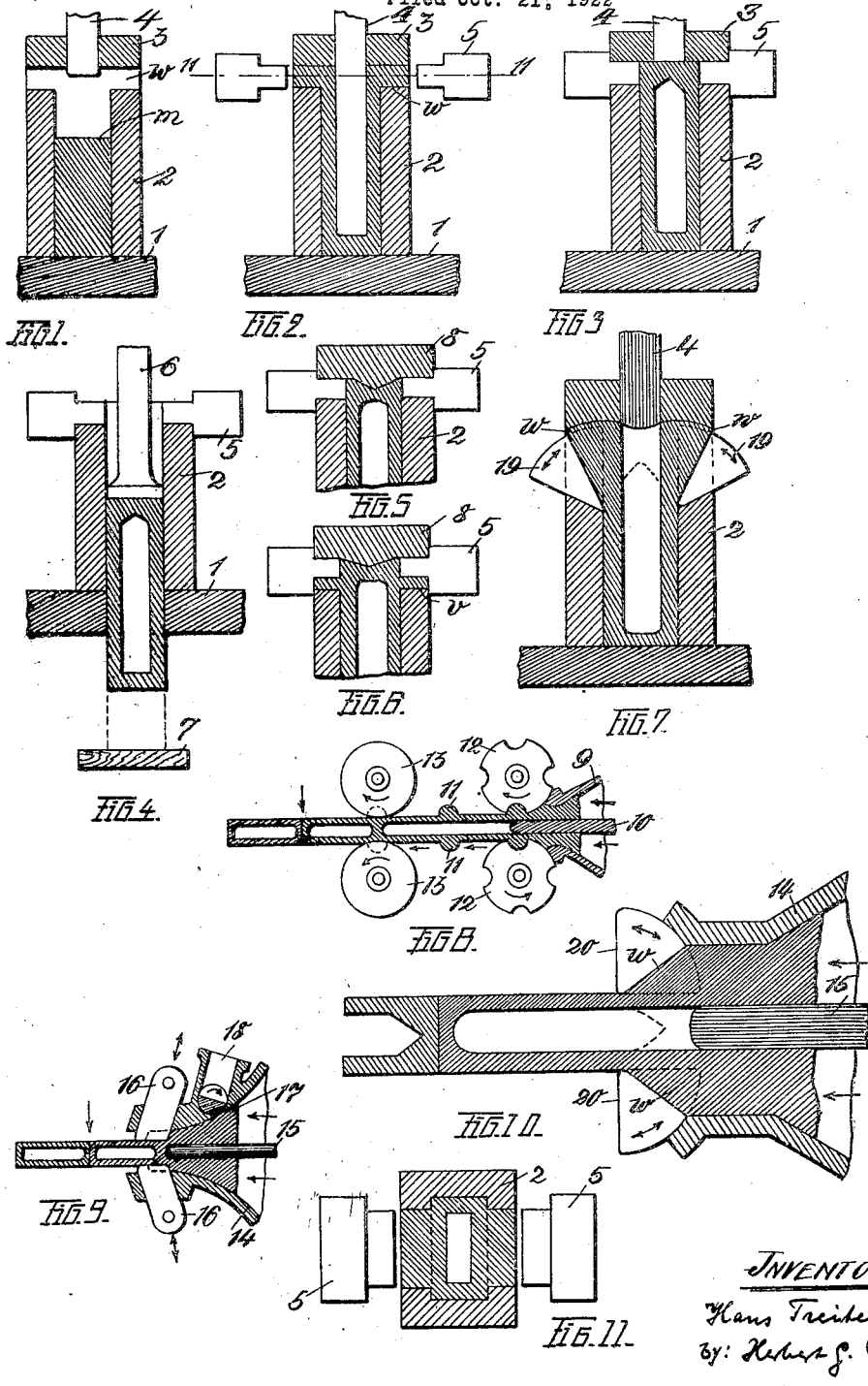

1,507,219

UNITED STATES PATENT OFFICE.

HANS TREITEL, OF BERLIN, GERMANY.

PROCESS FOR THE MANUFACTURE OF HOLLOW BRICKS CLOSED ON ALL SIDES.

Application filed October 21, 1922. Serial No. 596,124.

*To all whom it may concern:*

Be it known that I, HANS TREITEL, a citizen of the German Republic, and a resident of Berlin, Germany, Grosse Frankfurterstrasse 106, have invented certain new and useful Improvements in a Process for the Manufacture of Hollow Bricks Closed on All Sides, of which the following is a specification.
It has already been repeatedly attempted to produce hollow bricks closed on all sides, for instance by pressing or pasting the material forming the outer wall of the hollow brick towards the hollow of the same to form a closure. However, the quantity of material used therefor depends upon the thickness of the wall, which is generally too thin. Moreover, the material forming the closure is not subjected to pressure failing an abutment to press it upon.

The process according to the invention is characterized in that two oppositely lying walls of the brick to be closed are pressed and their ends provided with outer burrs or flanges in the course of the same operation, the said flanges being thereafter pressed towards and into one another substantially at right-angles to the axis of the hollow for the purpose of forming a closure.
The devices illustrated in Figures 1 to 7 relate to the process as carried out on crank-driven, eccentric-driven or hydraulically driven presses or the like, in which the press ram or the press mould are reciprocated.
Figures 8 to 10 relate to two constructions of continuous-working presses in which the process according to the invention is carried into practice.

Figure 11 is a section along the line 11—11 of Figure 2.

In the device of Figure 1, a press mould 2 is arranged on a table 1, the said press mould being adapted to deal with one or more bricks. After the mould is filled with the desired plastic material $m$, a cover 3 is placed in position above the mould 2 so that a lateral space $w$ is left. The press ram or plunger 4 is thereafter thrust into the mould by mechanical pressure or otherwise.
wise. The material in the mould is now divided as illustrated in Figure 2 so that the space $w$ between the mould 2 and the cover 3 is filled with the said material. The plunger 4 is now withdrawn until it is flush with the cover 3 (Figure 3). A hollow brick is thus produced which is however not entirely closed because of the opening left by the plunger (Figure 2). The brick is closed by the inward movement of press members 5 (Figure 3) onto the material filling the spaces $w$ of the mould, the said material extending outwardly by several thicknesses of the wall of the finished brick. The press members 5 advance only as far as the outer dimension of the brick, that is to say they do not penetrate into the walls of the brick and are afterwards brought back to their outer initial position.

The hollow brick is now finished and is ejected from the mould by an ejector 6 preferably straightaway onto a drying frame 7 (Figure 4) after the press plunger 4 and the cover 3 have been previously removed.

The above-described operations may be carried out, if desired, on a rotary press or on several presses, in sequence or in groups. To that end, it is preferable to hollow out simultaneously a large number of bricks in a common mould, to press them, to eject them and also to cut them to their desired dimensions.

In order to put additional pressure onto the joint formed by the material of the closure which is inwardly pressed by the press members 5, the mould 2 can be closed by a cover 8 the inner face of which is provided with a ridge, as shown in Figure 5. The sunk-in end face thus given to the brick is subsequently cut flat.

Means are provided to prevent those parts of the walls of thin-walled bricks nearest to the outer burr or flange $w$ being pressed in together with the said burr. These means consist in strengthening the endangered points by making the outer burr of material wider than is required to form the wall of the closure so that a portion $v$ of the said burr or flange is left intact by the impressing members 5 (Figure 6). The walls are thus strengthened and protected while the brick is being closed. The untouched portion of the burr is stripped off as waste when the brick is ejected.

In Fig. 7 a device is illustrated having oscillating press members 19. When the press plunger 4 is thrust into the mould 2, the press members 19 are in the position shown in Fig. 7 in full lines. The outer burrs or flanges $w$ have then a wedge-like form. The pressing in of the burrs or flanges is effected by swinging the press members 19 inwardly until their faces adjacent to the burrs form a common level with the inner faces of the mould 2.

The following steps may for instance be resorted to in order to carry the invention into practice on a continuous working press or the like (Figure 8).

A hollow strip formed by a plunger 10 is caused to issue from the mouth end 9 of an ordinary screw-press. The said strip is provided with outer burrs 11, the distance apart of which corresponds to the size of the bricks. These burrs may be produced for instance by arranging suitably dented rollers 12 immediately at the point of issue of the strip from the mouth of the machine, the said rollers rotating in the direction of motion of the strip and forming the desired burrs on the latter. These burrs constitute the material required to form the closing walls at the points where the strip is cut into bricks in known manner. To that end, the burrs 11 must be inwardly pressed, before they are cut, for instance by means of smooth rollers 13 or by punches or the like pressing the said burrs inwardly at suitable intervals of time. A hollow strip is thus obtained which is separated inside by transverse walls at a definite distance apart and formed by the inwardly pressed burrs 11. The strip is to be cut at these points into separate bricks, this being carried out for instance with known automatic cutting apparatus.

Figure 9 illustrates a further device by means of which the process according to the invention may be carried out on a continuous working press. In this device a hollow strip is pressed over the plunger 15 out of the mouth 14, the thickness of two opposite walls of the brick being that desired for the hollow brick plus the width of the required burr. Two transversally and oppositely arranged press members 16 are located immediately at the point of issue of the hollow strip, the said press members being adapted to press substantially at right-angles upon the strip. When the press members 16 are in the inwardly projecting position (as shown) a strip having the desired thickness of the walls of the hollow brick issues from the mouth thus narrowed. The press members 16 are moved outwardly at intervals of time corresponding to the length of the brick, so that the mouth is widened by the thickness of the burr. A portion of the strip now comes out of the mouth with a thickened wall and comes between the press members which are brought back to the inwardly projecting position after the strip has moved forward by a certain extent so that the material of the burr (shown in dotted lines) lying outside the dimensions of the brick is pressed inwardly immediately behind the plunger. The press members remain in this position until the above-described operations are resumed. The hollow strip with pressed-in partitions thus obtained is also turned in known manner into single bricks by cutting through the centre of the said partitions.

As the pressed material does not issue from the usual screw presses at uniform speed, the movements of the press members must be made dependent on the speed of advance of the outcoming strip and this may be done by allowing the press members 16 to move with the strip, as is the case with the cutting wire of known cutting machines, or by controlling the said press members by known measuring rollers.

Should the press members be moved at uniform intervals of time, it is then necessary to equalize the variations in speed of the strip. To that end, a regulator 17 for instance is provided (Figure 9) for regulating the pressure inside the press so that the said regulator is opened to a greater or lesser extent according as the said pressure rises or drops. The material let out for regulation purposes is preferably led back to the hopper of the press through the conduit 18.

The speed of the strip being dependent upon the pressure, the said speed is thus regulated. The adjustment of the regulator may be made by hand or may be dependent upon the speed of the strip.

When using oscillating press members, as shown in Figure 10, these members 20 are arranged at the widened mouth-piece of the press in such a manner that the axis of rotation of each press member lies nearly or exactly in the outer surface of the bricks. By the outward swinging of the press member 20 into the positions illustrated in Figure 10 in full lines the rooms $w$ are vacated and then filled by the material pressed after. By the following inward swinging of the press members the portions $w$ of the material are pressed in the interior of the bricks adjacent the end of the plunger 15 and hereby the brick is closed. In this position, shown in the drawing in dotted lines, remain the press members, until the strip is advanced for the amount of the length of a brick, then the operation is repeated.

A detrimental vacuum may easily form in the hollow of the brick when the plunger or core is withdrawn from the material surrounding it. This may be prevented by resorting to various known means. For instance the front end of the plunger may be fitted with a thin conical pin which pierces the material of the brick when the latter is pressed but withdraws together with the plunger and allows air to enter the hollow brick. Far from being detrimental, the small hole left in the wall of the brick allows the vapours formed in the course of drying to escape from within the said brick.

A vacuum may also be prevented by boring the plunger longitudinally so that air enters the brick when the said plunger recedes. In order to prevent the air passage from being stopped up, the front end of the plunger may be provided with a kind of valve plate which closes when pressing takes place but is removed from the mouth of the air passage at the time of withdrawal of the plunger by the pressure of a small spring or by the vacuum formed.

Having now particularly described and ascertained the nature of my said invention and in what manner the same is to be performed, I declare that what I claim is:—

1. A process for the manufacture of hollow bricks closed on all sides consisting in a hollow brick being first pressed with an open end and burrs of suitable thickness on two opposite walls and then pressing the burrs towards one another thereby forming a closed end having the desired cross-sectional dimensions.

2. A process for the manufacture of hollow bricks closed on all sides consisting in a hollow brick being first pressed in one operation with an open end and burrs on two opposite walls, the thickness of the burrs being such that a subsequent pressing towards one another of the thickened parts of the walls forms a closed end having at least the desired cross-sectional dimensions and then pressing the burrs toward one another.

3. A process for the manufacture of hollow bricks closed on all sides consisting in a hollow brick being first pressed with an open end and burrs of suitable thickness on two opposite walls and then pressing the burrs towards one another thereby forming a closed end having the desired cross-sectional dimensions a portion of the burrs being left as an outer strengthening of the wall of the brick to prevent the said wall from being deformed.

4. A process for the manufacture of hollow bricks closed on all sides consisting in a hollow brick being first pressed with an open end and burrs of suitable thickness on two opposite walls and then pressing the burrs towards one another thereby forming a closed end having the desired cross-sectional dimensions the burrs or thickened parts of the walls of the brick being formed in one operation together with the pressing of the brick.

5. A device for the manufacture of hollow bricks closed on all sides consisting in combination of a mould, lateral spaces thereon, said mould and spaces being adapted to be filled with plastic material, a press ram or plunger adapted to press the hollow brick within said mould and spaces with an open end and thickened walls and press-members adapted to press the projecting thickened parts of the walls towards one another after the plunger is withdrawn, for the purpose of closing the open end of the brick.

6. A device for the manufacture of hollow bricks closed on all sides consisting in combination of a mould, lateral spaces thereon, said mould and spaces being adapted to be filled with plastic material, a press ram or plunger adapted to press the hollow brick within said mould and spaces with an open end and thickened walls, a wedge-like plate adapted to replace the cover after the plunger is withdrawn and press-members adapted to press the projecting thickened parts of the walls towards one another after the plunger is withdrawn, for the purpose of closing the open end of the brick, said wedge like plate performing an additional amount of pressure due to the deflection caused by the wedge-like faces.

In testimony whereof I have affixed my signature.

DRGT. ING. HANS TREITEL.